UNITED STATES PATENT OFFICE.

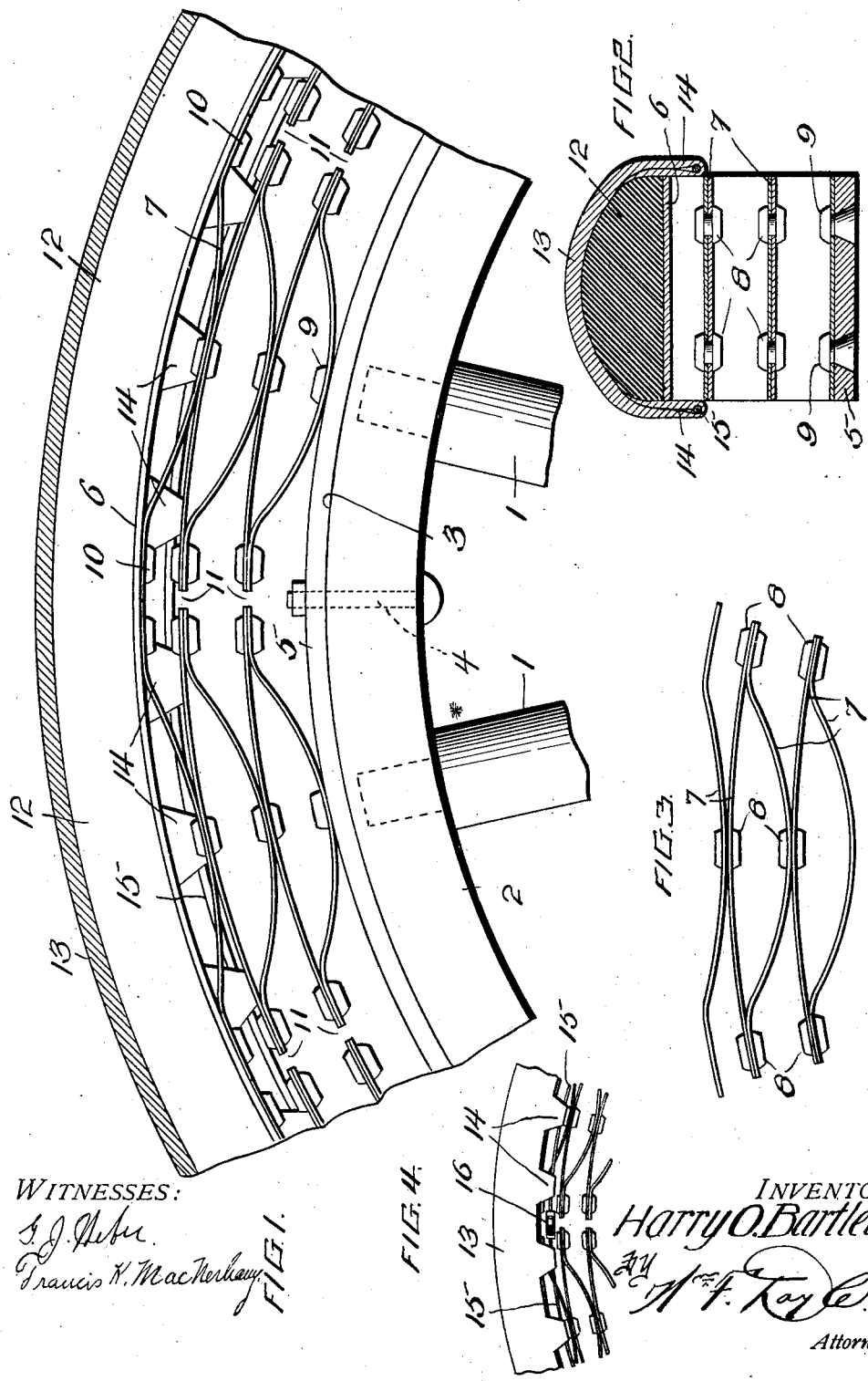

HARRY O. BARTLETT, OF CALDWELL, OHIO.

TIRE.

1,037,412.  Specification of Letters Patent.  Patented Sept. 3, 1912.

Application filed October 16, 1911. Serial No. 654,893.

*To all whom it may concern:*

Be it known that I, HARRY O. BARTLETT, a citizen of the United States, residing at Caldwell, in the county of Noble and State of Ohio, have invented certain new and useful Improvements in Tires, of which the following is a specification.

My invention relates to improvements in tires of a nonpneumatic character but having the same resilient qualities, with the minimum amount of rubber.

The invention has for an object to provide a new and improved construction and arrangement of springs rigidly connected at their ends and disposed to form a circle of separated segments concentric with the wheel hub.

These and other objects in view, will be readily understood by reference to the drawings forming a part of this specification, in which similar numerals of reference indicate corresponding parts in all the figures of the drawings.

In the drawings, Figure 1 is a longitudinal section of a portion of my improved tire showing a part of the felly and spokes contiguous thereto. Fig. 2 is a transverse section not showing the felly. Fig. 3 is a detail of one of the resilient units removed from the tire and Fig. 4 is a reduced elevation of a portion of the tire to show the manner of securing the leather tread in place.

Referring to the drawings by numerals, 1 represents the spokes, 2 the felly and 3 the flat outer surface of same. My improved tire is mounted on said flat surface 3 of the felly by slipping it on from the side and is secured thereto by the bolts 4.

The tire is constructed as follows; an inner steel band 5 which snugly fits the felly, an outer steel band 6 found in practice to be best suited for the work if somewhat thinner than band 5; interposed between said bands 5 and 6 are a series of built up spring units as shown in Fig. 3, said members are constructed of spring steel plates 7 arranged as shown and being united together at 8, said spring unit is secured at 9 to the band 5 and to the band 6 at 10, and as will be noted, the outer spring plate 7 abuts against the adjoining spring plate 7, while the other spring plates 7 are somewhat shorter, thus leaving a space 11 between the ends of said inner plates and the next adjoining plates, which provide for movement of the ends of these plates when under compression, which will avoid shearing of the bolts 8. Mounted on the outer face of band 6 is a rubber tread member 12, over which is arranged the tread 13, having extensions 14 on either side forming a part thereof and as shown are turned back and secured in a manner to form loops in which heavy wires 15 are run, said wires being provided with turn buckles 16 for securing said tread firmly in place. It will be seen that the extensions 14 also retain the rubber upon the band 6, so that no additional means will be required to maintain these parts in place. It has been found by experiment that this construction of springs arranged as shown so as to admit of play at their ends, meets what has proved to be the greatest difficulty encountered with this general construction.

By removing the nuts on bolts 4 and slightly withdrawing same, the complete tire can be removed. Should any one of the spring units be broken, said unit can be removed. It will not be necessary to remove other than this one part, which can be done after loosening one of the wires 15 and removing the securing means shown at 9 and 10.

In the construction shown the spring plates are rigidly connected at their ends thus forming a spring which expands bodily without friction or noise, and as the outer plates are arranged concentric to a wheel hub they contact at their ends under extreme compression through a longitudinal movement in their travel toward the center of the wheel to form a supporting ring which prevents injury to the springs. By securing the superposed springs at their centers a slight rolling movement is permitted during ordinary compression of the tire which is necessary to the greatest efficiency under the wave like movement in use. The abutting springs secured to the outer band reinforce this band at their secured ends which is the point of least resistance being removed from the center of the springs and provide a recess to permit a yielding of the band at that point. The adjacent springs prevent the compression of any single set as the tire tread always causes the compression of two or more and produces a coöperative circumferential action of the springs.

Having fully described my invention, what I claim and wish to secure by Letters Patent is:—

1. In a resilient tire, inner and outer bands, and a series of circumferentially arranged spring units interposed between said bands and comprising an inner spring secured at its center to the inner band and an outer spring rigidly connected at its ends to the inner spring and curved to form a circle of separated segments concentric with the inner band and having their ends alined adjacent each other and adapted to move longitudinally into contact to form a supporting ring.

2. In a resilient tire, inner and outer bands, a series of circumferentially arranged spring units interposed between said bands and comprising an inner spring secured at its center to the inner band and an outer spring rigidly connected at its ends to the inner spring and curved to form a circle of separated segments concentric with the inner band and having their ends alined adjacent each other and adapted to move longitudinally into contact to form a supporting ring, and a curved spring connected at its ends to the outer band and intermediate thereof to the outer spring member.

3. In a resilient tire, inner and outer bands, a continuous series of spring members interposed between said bands and comprising an inner spring secured at its center to the inner band and an outer spring rigidly connected at its ends to the inner spring and curved to form a circle of separated segments concentric with the inner band having their ends adapted to move longitudinally into contact under extreme compression to form a supporting ring, and a series of curved springs having their ends in contact and secured to the outer band and intermediate thereof to the outer spring.

In testimony whereof I affix my signature in presence of two witnesses.

HARRY O. BARTLETT.

Witnesses:
C. O. Dye,
C. L. Hillyard.

Copies of this patent may be obtained for five cents each, by addressing the "Commissioner of Patents, Washington, D. C."